United States Patent Office 2,945,477
Patented July 19, 1960

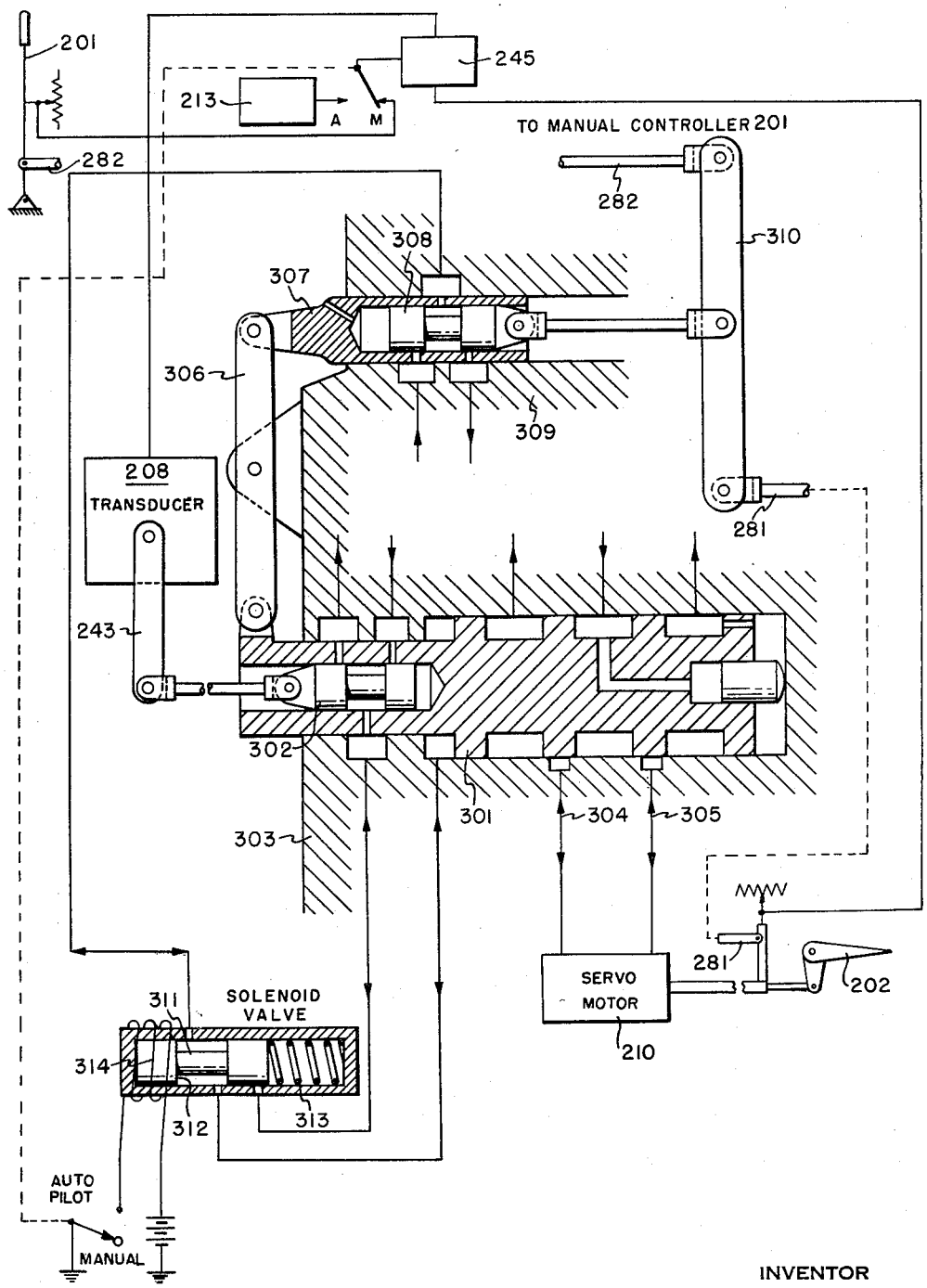

2,945,477

CONTROL SYSTEMS FOR AIRCRAFT

Ruben Hadekel, London, England, assignor to The Sperry Gyroscope Company Limited, Brentford, England, a company of Great Britain Filed July 18, 1956, Ser. No. 598,685

Claims priority, application Great Britain July 29, 1955

5 Claims. (Cl. 121—41)

This invention relates to control systems for aircraft, and is an improvement in or modification of patent application No. 495,143, of H. B. Sedgfield, W. R. Bohnel, A. P. Glenny and F. A. Summerlin for Control Systems for Aircraft, filed March 18, 1955, and application 525,682 of said Sedgfield and Bohnel, M. L. Jofeh and applicant, filed August 1, 1955.

The identified applications are concerned with an arrangement for providing alternative electrical control and emergency mechanical control of one and the same hydraulic servo-motor for actuating the control surface of an aircraft. The applications claim inter alia an integrated electro-hydraulic and mechanico-hydraulic control system capable of exercising control of an hydraulic servo-motor in either of two modes of operation, one of which effects control electro-hydraulically from an electric control signal, and the other effects control mechanico-hydraulically from a manual controller, comprising: electrical differential means adapted to provide an electrical control quantity under the differential control of two electric signal producing devices, one providing a demand signal defining motion to be imparted to a load member, such as a control surface of an aircraft, by means of the hydraulic servo-motor, and the other providing a negative feed-back signal in dependence on motion of the output member of the servo-motor; an electrical control device having connections for receiving the electrical control quantity; a mechanical differential means connected or adapted to be connected between the manual controller and the output member of a servo-motor, and having a differential output member adapted to be displaced in accordance with the difference between displacement of the manual controller and the output member of the servo-motor; the said electrical control device and the said mechanical differential output member each being adapted to control valve means suitable for variably controlling the delivery of pressure fluid from a pressure source to the servo-motor to cause movement of the output member of the servo-motor in one direction or the other; and control-transfer means adapted selectively to render either the mechanical differential means or the electrical differential means effective, and the other ineffective, to control operation of the servo-motor.

The system of the identified applications thus provides two modes of operation, viz., an electro-hydraulic mode and a mechanico-hydraulic mode. In the electro-hydraulic mode, there are two ways of providing the electrical signal. In one of these two ways, a component of the demand electrical signal is provided by a manual controller, while in the other way, the demand electrical signal is provided by flight monitoring instruments alone. In either of these forms of electrical control, the demand electrical signal is opposed by a feedback signal, and the difference or error signal is used to energise a transducer which displaces a pilot valve. This pilot valve moves in the interior of a sleeve valve, which is constrained to follow the pilot valve. In doing so, the sleeve valve itself controls the supply of hydraulic fluid to the main hydraulic servo-motor.

The alternative mode of operation, viz., the mechanico-hydraulic mode, may be brought into operation automatically in emergencies, or may be brought into operation at will. For the mechanico-hydraulic mode, there is particularly described a separate control valve for the servo-motor, which control valve is mechanically actuated by the output member of a mechanical differential connected on the one hand to the manual controller and on the other hand to the output member of the servo-motor. To put this mechanico-hydraulic mode of operation into effect, hydraulic connections are switched by a control-transfer valve, which puts the mechanically actuated valve in control of the supply of fluid to the servo-motor. The output member of a servo-motor is constrained to follow movements of the manual controller by servo action resulting from operation of the mechanically actuated control valve by the mechanical differential.

According to the present invention, the control system is characterized in that the means for controlling the servo-motor comprises a valve which is controlled by one or other of two pilot valves, one pilot valve being actuated by the electrical differential means via said electrical control device and the other pilot valve being actuated by the mechanical differential means, and said control-transfer means comprising a solenoid valve which is biased in such a manner as to render the mechanical differential means and its corresponding pilot valve operative to control the said control valve when the solenoid valve is not energised, and the electrical differential and its corresponding pilot valve operative to control the said control valve when the solenoid valve is energised.

Preferably, each pilot valve comprises a sleeve, the two sleeves being linked so as to move in correspondence and the sleeve of the pilot valve associated with the electrical differential means constituting the movable part of said control valve.

In order that the invention may be readily carried into effect, an embodiment, by way of example, will now be described with reference to the accompanying drawing.

The drawing shows a schematic view of a preferred embodiment of my improved dual electric and mechanical control for hydraulic systems.

This system provides for a servo motor 210 which is adapted to control a control surface 202 of an aircraft, e.g., an elevator, and is hydraulically operated under control of a control valve, which control valve comprises a sleeve 301, cylinder 303 and a pilot valve spool 302. Fluid is fed at high pressure to this control valve (indicated in the drawing by arrows going into the control valve), there being provision for a low pressure return path (which is indicated by arrows leaving the control valve). The pilot valve spool is connected to an arm 243 of an electrically-operated transducer 208.

In the electro-hydraulic mode of operation, the transducer 208 is controlled by a difference signal, which is derived from comparison in an electrical differential means 245 of an electrical signal corresponding to the position of the output member 281 of the servo motor 210 with either, an electrical signal corresponding to the position of a manual controller 201 or, an electrical signal supplied by an automatic pilot 213. The difference signal fed as an input to the transducer 208 causes arm 243 to move valve spool 302. This movement of valve spool 302 controls the flow of fluid in such a way as to cause sleeve 301 to follow it. By moving, sleeve 301 uncovers ports in cylinder 303 and thereby controls the flow of fluid through conduits 304 and 305, which are coupled to the servo-motor 210. It will be seen that if sleeve 301 moves to the left of the position shown in the drawing, conduit 304 will be connected to the high pressure fluid supply and conduit 305 to the low pressure return. If sleeve 301 is moved to the right of the position shown in the drawing the connections of the supply of fluid will be reversed in the conduits 304 and 305. Thus, the pilot valve spool 302 moves under the action of a difference signal supplied to transducer 208, which movement causes a movement of sleeve 301, and due to the hydraulic connection to the servo motor causes it, the servo motor, to move. This movement of the servo motor, besides operating the control surface of the aircraft 202, also changes the signal fed to the electrical differential means, and thus varies the difference signal supplied to transducer 208.

Considering, for the moment, the alternative mechanico-hydraulic mode of operation (the means of changing from one mode to the other will be described later), the sleeve 301 is connected by centrally pivoted lever 306 to the sleeve 307 of another pilot valve. This pilot valve comprises a pilot valve spool 308 and a cylinder 309. Pilot valve spool 308 is pivotally connected to the centre of a lever 310, which together with links 282 and 281, constitutes a mechanical differential. Link 281 is connected to the output member of the servo motor and the link 282 is connected to the manual controller 201. The position of pilot valve spool 308 is determined by the difference of position between the links 282 and 281. This difference causes spool 308 to move in sleeve 307, which movement controls the flow of fluid in hydraulic connections to the control valve in such a way as to cause sleeve 301 of the control valve to execute a similar motion. By virtue of the lever 306, sleeve 307 follows the movement of piston 308 and therefore ensures that body 301 of the control valve moves to a corresponding position. As before, movement of body 301 causes the servo motor to operate, which action moves link 281 in such a way as to return spool 308 to its zero position.

It will be appreciated that there are thus provided the two alternative modes of operation, all that is necessary being to decide which pilot valve shall control the system. For this purpose, the control-transfer valve in the form of solenoid valve 311 is provided. Valve 311 comprises a plunger 312, a spring 313 and a solenoid 314. When the solenoid is not energised, plunger 312 is biased into the position shown in the drawing by spring 313. In this position, the pilot valve associated with the mechanical differential is in control of the position of sleeve 301, and therefore the system is in the mechanico-hydraulic mode of operation. When solenoid 314 is energised, plunger 312 moves to the right against the force of spring 313, so that the connection between sleeve 301 and the pilot valve associated with the mechanical differential is interrupted and a hydraulic connection is established between sleeve 301 and the pilot valve associated with the transducer 208. In this latter position, the system is operating in the electro-hydraulic mode, and at the choice of the pilot, this mode enables control by the manual controller or, alternatively, control by an automatic pilot.

If the device fails for one reason or another when in the electro-hydraulic mode of operation, the current to solenoid 314 is interrupted, whereupon spring 313 drives plunger 312 into the position shown in the drawing, and the system automatically reverts to the mechanico-hydraulic mode of operation. The changeover either way can, of course, be controlled by the pilot at will through a suitable manually operated switch settable in either autopilot or manual position.

To prevent jolting of the system during changeover from electro-hydraulic to mechanico-hydraulic operation, body 301 of the control valve is designed to have a slow response to the mechanically-operated pilot valve. The slowed response ensures a smooth take up of control when the system is changed from the electrical to the mechanical mode of operation.

What is claimed is:

1. A dual electro and mechanical control for hydraulic systems, including a hydraulic master control valve, a hydraulic servo-motor controlled therefrom, two pilot valves, hydraulic means for moving said control valve to follow the movements of either one of the two pilot valves, one of said pilot valves being within said control valve, a sleeve in which the other pilot valve is mounted, a signal means from which one of said pilot valves is moved, a signal means from which the other of said valves is moved, alternative hydraulic means for causing movement of said control valve from either the one or the other pilot valve, and means connecting the one pilot valve to the sleeve of the other pilot valve to move said sleeve from said control valve.

2. A dual electro and mechanical control for hydraulic systems as claimed in claim 1, in which the signal means for controlling the first pilot valve is electrical and the signal means for controlling the second pilot valve is mechanical.

3. A dual electro and mechanical control for hydraulic systems as claimed in claim 1, having means for delaying the movement of said control valve to prevent jolting of the system in changeover from electro hydraulic to mechanico hydraulic operation.

4. A dual electro and mechanical control for hydraulic systems as claimed in claim 1, having a follow-back connection from the servo-motor affecting the control of each of said pilot valves.

5. A dual electro and mechanical control for hydraulic systems as claimed in claim 1 in which the one pilot valve includes a spool and a sleeve and wherein said valve connecting means is a lever connecting the sleeve of the one pilot valve and the sleeve of the other pilot valve.

References Cited in the file of this patent

UNITED STATES PATENTS 2,678,177     Chenery et al.    ---------- May 11, 1954